(No Model.)
C. KRAMER.
WHEEL.
No. 390,977. Patented Oct. 9, 1888.
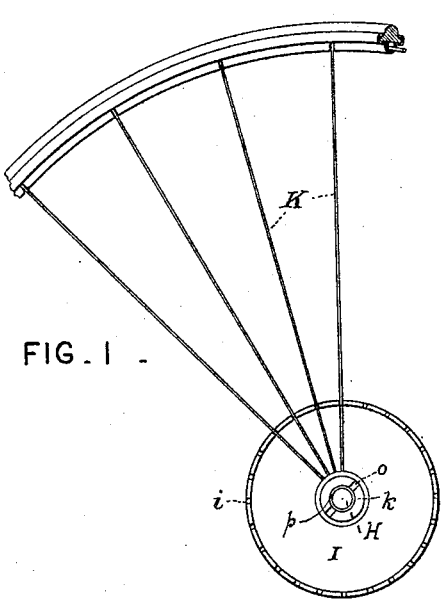
FIG. I.
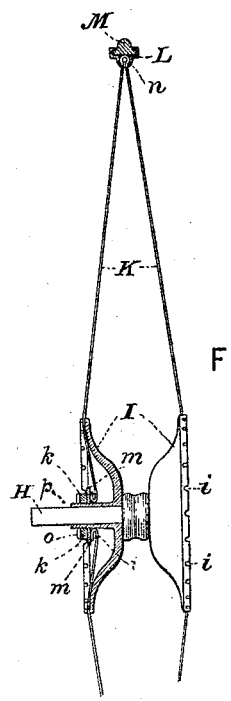
FIG. II.
Attest:
Geo. T. Smallwood.
Philip Mauro
Inventor.
Camillo Kramer
by A. Pollok
his attorney.

UNITED STATES PATENT OFFICE.

CAMILLO KRAMER, OF ALBANY, NEW YORK.

WHEEL.

SPECIFICATION forming part of Letters Patent No. 390,977, dated October 9, 1888.

Application filed May 21, 1888. Serial No. 274,517. (No model.)

*To all whom it may concern:*

Be it known that I, CAMILLO KRAMER, of Albany, in the county of Albany and State of New York, have invented a new and useful Improvement in Wheels, which improvement is fully set forth in the following specification.

This invention relates to the construction of wheels for velocipedes and other light vehicles, the object being to produce a wheel combining lightness and strength.

According to this invention, the felly is a hollow ring open on its face and having three internal annular recesses. The spokes are all provided with eyes in the outer ends and pass through slots in the felly. In one of the recesses of the latter is a stay-wire, which is threaded through the eyes of all the spokes. The latter may be composed of double wires, their inner ends being lapped around a ring surrounding the axle and being held and tightened, when necessary, by straining-nuts. The two side recesses of the hollow felly receive beads on a rubber tire, which is sprung into them, and thus held in place without the use of cement.

In the accompanying drawings, Figure I is a partial side view, and Fig. II a sectional elevation, of a wheel constructed in accordance with the invention.

On the axle H are secured two cup-shaped disks, I, with their concave sides turned outward. These may be keyed on the axle or secured in place in other suitable ways. The spokes K are composed of steel wires doubled at the middle, where they are connected with the felly L and hooked at the ends around rings or washers $h$, surrounding the threaded tube $p$, which springs from the center of cup I and closely fits on the axle H. Each wire thus forms two spokes, one on each side of the wheel. Rings $h$ are held in place by nuts $k$, which screw onto the tube $p$, the latter being threaded for that purpose, and washers $m$ may be interposed between nuts $k$ and rings $h$.

The felly L is hollow or trough-shaped, having three internal recesses. In the bottom recess runs the stay-wire $n$, which passes through the eyes or loops of all the spoke-wires K, and thus connects them to the felly and also helps to stiffen the latter.

The rubber tire M is formed with a bead on each side, which beads fit in the lateral recesses of the felly L. The tire is sprung into place, and its displacement is prevented by the edges of the felly overlapping the beads on the tire. The use of cement to hold the tire in place is thus rendered unnecessary.

The rims of disks or cups I are provided at regular intervals with notches $i$, in which the spoke-wires K are laid, and thereby properly spaced and held in position.

The nuts $k$ have notches $o$ for a suitable wrench, and by turning the nuts in the proper direction the spoke-wires may all be tightened at the same time.

It is obvious that parts of the invention may be used without others, and that modifications may be made in the details of construction without departing from the spirit of the invention.

Having thus fully described my said invention, what I claim is—

1. In a wheel, the combination, with the hollow felly, of spokes having eyes in their outer ends, which ends pass through slots in said felly, and a stay-wire in said felly threaded through the eyes in said spokes, substantially as described.

2. The combination of the felly having a stay-wire therein, spoke-wires having eyes through which said stay-wire passes and looped at their inner ends around a ring encircling the axle, cup-shaped disks connected with the hub, upon the edges of which said wires rest, and nuts for tightening said spoke-wires, substantially as described.

3. The combination of the axle, the two cup-shaped disks secured thereon, having each a tubular threaded portion surrounding said axle, spoke-wires connected to the felly and lapped at their free ends around rings inside said cup-shaped disks, and straining-nuts screwing on said tubular threaded parts, substantially as described.

4. The combination of the felly, the stay-wire therein, and the spokes formed of wires doubled at the middle, forming eyes through which said stay-wire passes, the free ends of said wires being attached to the hub, substantially as described.

5. The combination, with the felly having recesses at the sides and bottom, of the tire having beads fitting in the lateral recesses, the doubled spoke-wires attached at their free ends to the hub, and the stay-wire in the bottom recess of the felly and passing through the loops or eyes of said spoke-wires, substantially as described.

In testimony whereof I have signed this specification in the presence of two subscribing witnesses.

CAMILLO KRAMER.

Witnesses:
JOHN F. MANSON,
CHARLES J. KRANK.